United States Patent
Davies et al.

(10) Patent No.: US 7,315,911 B2
(45) Date of Patent: Jan. 1, 2008

(54) METHOD FOR EFFICIENT INTER-PROCESSOR COMMUNICATION IN AN ACTIVE-ACTIVE RAID SYSTEM USING PCI-EXPRESS LINKS

(75) Inventors: Ian Robert Davies, Longmont, CO (US); Gene Maine, Erie, CO (US); Rex Weldon Vedder, Boulder, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 210 days.

(21) Appl. No.: 11/178,727

(22) Filed: Jul. 11, 2005

(65) Prior Publication Data

US 2006/0161707 A1 Jul. 20, 2006

Related U.S. Application Data

(60) Provisional application No. 60/645,340, filed on Jan. 20, 2005.

(51) Int. Cl.
*G06F 13/24* (2006.01)
*G06F 13/00* (2006.01)

(52) U.S. Cl. .................. 710/260; 711/114; 710/261; 710/262; 710/266; 710/268

(58) Field of Classification Search ............... 711/114; 710/260–269
See application file for complete search history.

(56) References Cited

U.S. PATENT DOCUMENTS 4,217,486 A 8/1980 Tawfik et al.
4,428,044 A 1/1984 Liron (Continued)

FOREIGN PATENT DOCUMENTS

EP 0800138 A 10/1997

(Continued)

OTHER PUBLICATIONS

Budruk et al. PCI Express System Architecture. Addison Wesley Professional. Sep. 4, 2003.*

(Continued)

*Primary Examiner*—Mark H. Rinehart
*Assistant Examiner*—Matthew Spittle
(74) *Attorney, Agent, or Firm*—E. Alan Davis; James W. Huffman (57) ABSTRACT

A fault-tolerant RAID system is disclosed. The system includes redundant RAID controllers coupled by a PCI-Express link. When a PCI-Express controller of one of the RAID controllers receives a PCI-Express memory write request transaction layer packet (TLP), it interprets a predetermined bit in the header as an interrupt request flag, rather than as its standard function specified by the PCI-Express specification. If the flag is set, the PCI-Express controller interrupts the processor after storing the message in the payload at the specified memory location. In one embodiment, an unused upper address bit in the header is used as the interrupt request flag. Additionally, unused predetermined bits in the TLP header are used as a message tag to indicate one of a plurality of message buffers on the receiving RAID controller into which the message has been written. The PCI-Express controller sets a corresponding bit in a register to indicate which message buffer was written.

82 Claims, 5 Drawing Sheets

U.S. PATENT DOCUMENTS

| | | | |
|---|---|---|---|
| 5,345,565 A | | 9/1994 | Jibbe et al. |
| 5,408,644 A | * | 4/1995 | Schneider et al. ............. 714/1 |
| 5,483,528 A | | 1/1996 | Christensen |
| 5,530,842 A | | 6/1996 | Abraham et al. |
| 5,619,642 A | | 4/1997 | Nielson et al. |
| 5,668,956 A | | 9/1997 | Okazawa et al. |
| 5,680,579 A | | 10/1997 | Young et al. |
| 5,706,283 A | * | 1/1998 | Suzuki ..................... 370/311 |
| 5,812,754 A | | 9/1998 | Lui et al. |
| 5,881,254 A | | 3/1999 | Corrigan et al. |
| 6,009,275 A | * | 12/1999 | DeKoning et al. .......... 710/220 |
| 6,038,680 A | | 3/2000 | Olarig |
| 6,058,455 A | | 5/2000 | Islam et al. |
| 6,094,699 A | | 7/2000 | Surugucchi et al. |
| 6,098,140 A | | 8/2000 | Pecone et al. |
| 6,185,652 B1 | | 2/2001 | Shek et al. |
| 6,243,829 B1 | | 6/2001 | Chan |
| 6,272,533 B1 | | 8/2001 | Browne |
| 6,397,293 B2 | | 5/2002 | Shrader et al. |
| 6,421,769 B1 | | 7/2002 | Teitenberg et al. |
| 6,438,603 B1 | | 8/2002 | Ogus |
| 6,470,429 B1 | | 10/2002 | Jones et al. |
| 6,493,795 B1 | | 12/2002 | Arsenault et al. |
| 6,502,157 B1 | | 12/2002 | Batchelor et al. |
| 6,507,581 B1 | | 1/2003 | Sgammato |
| 6,629,179 B1 | | 9/2003 | Bashford |
| 6,718,408 B2 | | 4/2004 | Esterberg et al. |
| 6,732,243 B2 | * | 5/2004 | Busser et al. ............... 711/162 |
| 6,839,788 B2 | | 1/2005 | Pecone |
| 6,912,621 B2 | | 6/2005 | Harris |
| 7,046,668 B2 | * | 5/2006 | Pettey et al. ................ 370/392 |
| 7,069,368 B2 | | 6/2006 | Thornton |
| 7,107,343 B2 | | 9/2006 | Rinaldis et al. |
| 2001/0013076 A1 | | 8/2001 | Yamamoto |
| 2002/0029319 A1 | | 3/2002 | Robbins et al. |
| 2002/0069317 A1 | | 6/2002 | Chow et al. |
| 2002/0069334 A1 | | 6/2002 | Hsia et al. |
| 2002/0083111 A1 | | 6/2002 | Row et al. |
| 2002/0091828 A1 | | 7/2002 | Kitamura et al. |
| 2002/0099881 A1 | | 7/2002 | Gugel |
| 2002/0194412 A1 | | 12/2002 | Bottom |
| 2003/0065733 A1 | | 4/2003 | Pecone |
| 2003/0065836 A1 | | 4/2003 | Pecone |
| 2004/0177126 A1 | | 9/2004 | Maine |
| 2005/0044169 A1 | | 2/2005 | Arbeltman et al. |
| 2005/0102557 A1 | | 5/2005 | Davies et al. |
| 2006/0282701 A1 | | 12/2006 | Davies et al. |

FOREIGN PATENT DOCUMENTS

| | | |
|---|---|---|
| EP | 0817054 | 1/1998 |
| EP | 0967552 | 12/1999 |
| GB | 2396726 A | 6/2004 |
| JP | 2001142648 | 5/2001 |
| WO | WO 2007002219 A2 * | 1/2007 |

OTHER PUBLICATIONS

LSI Corporation. MegaRAID SAS 8408E. Product Brief. 2007.*

Young et al. *A high I/O reconfigurable crossbar switch*. 11th Annual IEEE Symposium on Field-Programmable Custom Computing Machines, 2003. FCCM 2003. Apr. 9-11, 2003. pp. 3-10.

Landman et al. *Activity-sensitive architectural power analysis*. IEEE Transactions on Computer-Aided Design of Integrated Circuits and Systems. Jun. 1996. pp. 571-587.

U.S. Office Action for U.S. Appl. No. 09/967,027, Examiner G. Ray, Apr. 30, 2004, pp. 1-7 and cover sheet.

U.S. Office Action for U.S. Appl. No. 09/967,126, Examiner T. Vo, Mar. 7, 2005, pp. 1-5 and cover sheet.

European Examination Report for Application No. GB0406742.7, dated Nov. 10, 2004.

European Examination Report for Application No. GB0406739.3, dated Nov. 10, 2004.

European Examination Report for Application No. GB0406740.1, dated Nov. 10, 2004.

"DCM PCI-X Verification Services" Datasheet #1. DCM Technologies, 39675 Cedar Blvd., #220, Newark, CA 94560, unknown date.

"PCI-X Synthesizable Core." inSilicon Corporation. San Jose, CA. 1999.

"IBM 133 PCI-X Bridge" Datasheet. Apr. 6, 2001.

"IBM 133 PCI-X Bridge" Datasheet 2000. IBM Microelectronics Division.

"Tsi320™ Software Initialization Application Note." Oct. 2001. 80A600B_AN002_01. Tundra Semiconductor Corporation.

"PCI-X Bus Test Environment." 1999, inSilicon Corporation 411 East Plumeria Dr. San Jose, CA 95134.

"1005 IDT Precise PCI-Express Family Presentation." Integrated Device Technology, unknown date.

"COMPAQ Rapid Enabler for PCI-X (CREX) Initiator Interface." (Preliminary). Revision 0.28 Sep. 2, 1999.

"COMPAQ Rapid Enabler for PCI-X (CREX) Target Bus Interface." (Preliminary). Revision 0.36 Sep. 2, 1999.

"Intel 41210 Serial to Parallel PCI Bridge Product Brief." Intel Corporation. 2003.

PERICOM. "Bridge Products Road Map." Customer Presentation. pp. 31, 33-35, unknown date.

IDT. "24-lane 3-Port PCI Express Switch" Product Brief. 89PES24N3. Dec. 22, 2005. Integrated Device Technology, Inc.

"PEX 8104" Data Book. Version 0.61. Mar. 2004. PLX Technology, Inc.

"PEX 8114 PCI Express to PCI/PCI-X Bridge." Product Brief. Version 2.0 2004. PLX Technology, Inc.

"Tsi320™ PCI/X-to-PCI/X Bus Bridge Manual." Jan. 2001. 80A600B_MA001_02. Tundra Semiconductor Corporation.

"Tsi320™ Dual-Mode PCI-to-PCI Bus Bridge Errata." Sep. 2001. 80A600B_ER001_05. Tundra Semiconductor Corporation.

"Tsi320™ Dual-Mode PCI-to-PCI Bus Bridge User Manual." Jun. 2001. 80A600B_MA001_04. Tundra Semiconductor Corporation.

"Corex-V10 PCI-X Initiator/Target" Datasheet #1. DCM Technologies, 39675 Cedar Blvd., #220, Newark, CA 94560, unknown date.

"X-caliber Design Specification: PCI-2.2/PCI-X Megacell" Rev 0.99.3. Nov. 19, 1999.

DCM Presentation. DCM Technologies. 39675 Cedar Blvd. #220, Newark, CA 94560, unknown date.

"PEX 8114: PCI-X -PCI Express Bridge." Data Book. Version 0.70. May 2004. PLX Technology, Inc.

"Corex-V10 PCI-X Initiator/Target" Datasheet #2. DCM Technologies, 39675 Cedar Blvd., #220, Newark, CA 94560, unknown date.

"DCM Corex-V10 FAQ." version 1.00. DCM Technologies, 39675 Cedar Blvd., #220, Newark, CA 94560, unknown date.

IDT. "24-lane 3-Port PCI Express Switch" Data Sheet. 89HPES24N3. Feb. 14, 2006. Integrated Device Technology, Inc.

"DCM PCI-X Verification Services" Datasheet #2. DCM Technologies, 39675 Cedar Blvd., #220, Newark, CA 94560, unknown date.

IDT. "12-lane 3-Port PCI Express Switch" Data Sheet. 89HPES12N3. Feb. 14, 2006. Integrated Device Technology, Inc.

IDT. "12-lane 3-Port PCI Express Switch" Product Brief. 89PES12N3. Feb. 15, 2006. Integrated Device Technology, Inc.

"Intel 41210 Serial to Parallel PCI Bridge Datasheet." Intel Corporation. Sep. 2003.

"Intel 41210 Serial to Parallel PCI Bridge Design Guide." Intel Corporation, Nov. 2003.

QuickLogic PCI Presentation. "QuickPCI™ Family of Embedded Standard Products (ESPs),", unknown date.

"QL5064—QuickPCI™" Datasheet, Rev B. Feb. 2, 2000. QuickLogic.

"IDT 89HPES12N3 PCI Express Switch." User Manual Table of Contents & Overview. Integrated Device Technology. Feb. 8, 2006.

"IDT 89HPES24N3 PCI Express Switch." User Manual Table of Contents & Overview. Integrated Device Technology, Feb. 8, 2006.

* cited by examiner

METHOD FOR EFFICIENT INTER-PROCESSOR COMMUNICATION IN AN ACTIVE-ACTIVE RAID SYSTEM USING PCI-EXPRESS LINKS

CROSS REFERENCE TO RELATED APPLICATION(S)

This application claims the benefit of pending U.S. Provisional Application Ser. No. 60/645,340 filed Jan. 20, 2005, entitled METHOD FOR EFFICIENT INTER-PROCESSOR COMMUNICATION IN AN ACTIVE-ACTIVE RAID SYSTEM USING PCI-EXPRESS LINKS, which is hereby incorporated by reference for all purposes.

FIELD OF THE INVENTION

The present invention relates in general to the field of message transfers between redundant storage controllers, and particularly to the generation of interrupt requests as notification of the message transfers.

BACKGROUND OF THE INVENTION

Redundant Array of Inexpensive Disk (RAID) systems have become the predominant form of mass storage systems in most computer systems today that are used in applications that require high performance, large amounts of storage, and/or high data availability, such as transaction processing, banking, medical applications, database servers, internet servers, mail servers, scientific computing, and a host of other applications. A RAID controller controls a group of multiple physical disk drives in such a manner as to present a single logical disk drive (or multiple logical disk drives) to a computer operating system. RAID controllers employ the techniques of data striping and data redundancy to increase performance and data availability.

One technique for providing high data availability in RAID systems is to include redundant fault-tolerant RAID controllers in the system. Providing redundant fault-tolerant RAID controllers means providing two or more controllers such that if one of the controllers fails, one of the other redundant controllers continues to perform the function of the failed controller. For example, some RAID controllers include redundant hot-pluggable field replaceable units (FRUs) such that when a controller fails, an FRU can be quickly replaced in many cases to restore the system to its original data availability level.

Redundant fault-tolerant RAID controllers communicate with one another by passing messages to one another in order to accomplish their fault-tolerant operation. Historically, the controllers have communicated via a common communication channel such as Fibre Channel or SCSI. Typically, these communication channels are also the I/O channels by which the RAID controllers communicate with the storage devices attached to them or to the host computers for which the RAID controllers provide data. Consequently, these communication channels may be subject to service interruptions if a storage device fails or if the physical channel medium is damaged or removed. Additionally, these communications channels typically incur a relatively high latency in communicating messages back and forth between the RAID controllers.

Therefore what is needed is a more reliable and efficient communication channel between redundant RAID controllers.

BRIEF SUMMARY OF INVENTION

The present invention provides a system and method for redundant RAID controllers to communicate via a PCI-Express link. In particular, the invention provides a method for using an unneeded predetermined bit in a PCI-Express memory write request transaction layer packet (TLP) header as an interrupt request flag, rather than as its standard function specified by the PCI-Express specification, to selectively cause the PCI-Express controller on the receiving RAID controller to interrupt its processor after storing the message in the packet to the specified memory location. In one embodiment, an unused upper address bit in the header is used as the interrupt request flag. Additionally, unused bits in the TLP header are used as a message tag to indicate one of a plurality of message buffers on the receiving RAID controller into which the message has been written. The PCI-Express controller also includes a message buffer register having a bit corresponding to each of the message buffers. When the PCI-Express controller receives a message and writes the message to a message buffer, it sets the bit in the register corresponding to the message buffer indicated in the message tag before interrupting the processor. This enables the transmitting RAID controller to queue up multiple messages to the receiving RAID controller before receiving an acknowledgement, and enables the receiving processor to efficiently determine which message buffers have a valid message without having to poll the message buffers.

In one aspect, the present invention provides a method for a first redundant array of inexpensive disks (RAID) controller to transfer data to a second RAID controller over a PCI-Express link via a PCI-Express memory write request transaction layer packet (TLP) and to also communicate an interrupt request to a processor of the second RAID controller via the address field of the header of the TLP. The method includes a PCI-Express controller of the second RAID controller receiving the memory write request TLP from the first RAID controller via the PCI-Express link. The method also includes the PCI-Express controller interpreting a predetermined address bit of the address field of the TLP header as an interrupt request flag rather than as an address bit. The method also includes the PCI-Express controller determining whether the interrupt request flag is a predetermined value. The method also includes the PCI-Express controller interrupting the processor if the interrupt request flag is the predetermined value.

In another aspect, the present invention provides a system wherein processors of redundant array of inexpensive disks (RAID) controllers communicate via a PCI-Express link using a PCI-Express memory write request transaction layer packet (TLP) having an address field within a header of the TLP. The system includes a PCI-Express link. The system also includes a first RAID controller, having a first PCI-Express controller coupled to the PCI-Express link, and a first processor configured to cause the first PCI-Express controller to transmit on the PCI-Express link a PCI-Express memory write request TLP. The processor is configured to cause the first PCI-Express controller to selectively set a predetermined address bit of the address field of the TLP header to a predetermined value as an interrupt request flag rather than as an address bit. The system also includes a second RAID controller, having a second processor, and a second PCI-Express controller coupled to the PCI-Express link, configured to receive the TLP from the first RAID controller, and to interrupt the second processor if the interrupt request flag is the predetermined value.

In another aspect, the present invention provides a method for a first redundant array of inexpensive disks (RAID) controller to transfer data to a second RAID controller over a PCI-Express link via a PCI-Express memory write request transaction layer packet (TLP) and to also communicate an interrupt request to a processor of the second RAID controller via the header of the TLP. The method includes a PCI-Express controller of the second RAID controller receiving the memory write request TLP from the first RAID controller via the PCI-Express link. The method also includes the PCI-Express controller interpreting a predetermined unused bit of the TLP header as an interrupt request flag rather than as the bit's standard function specified in the PCI-Express specification. The method also includes the PCI-Express controller writing payload data of the TLP into a memory of the second RAID controller at a location specified by an address in the TLP header. The method also includes the PCI-Express controller determining whether the interrupt request flag is a predetermined value. The method also includes the PCI-Express controller interrupting the processor if the interrupt request flag is the predetermined value.

In another aspect, the present invention provides a system wherein processors of redundant array of inexpensive disks (RAID) controllers transfer data with one another via a PCI-Express link using a PCI-Express memory write request transaction layer packet (TLP) and also communicate an interrupt request to each other via a header of the TLP. The system includes a PCI-Express link. The system also includes a first RAID controller, having a first PCI-Express controller coupled to the PCI-Express link, and a first processor configured to cause the first PCI-Express controller to transmit on the PCI-Express link a PCI-Express memory write request TLP. The processor is configured to cause the first PCI-Express controller to selectively set a predetermined unused bit of the TLP header to a predetermined value for use as an interrupt request flag rather than as the bit's standard function specified in the PCI-Express specification. The system also includes a second RAID controller, having a second processor, and a second PCI-Express controller coupled to the PCI-Express link, configured to receive the TLP from the first RAID controller, to write payload data of the TLP into a memory of the second RAID controller at a location specified by an address in the TLP header, and to interrupt the second processor if the interrupt request flag is the predetermined value.

DETAILED DESCRIPTION

Figure 1:
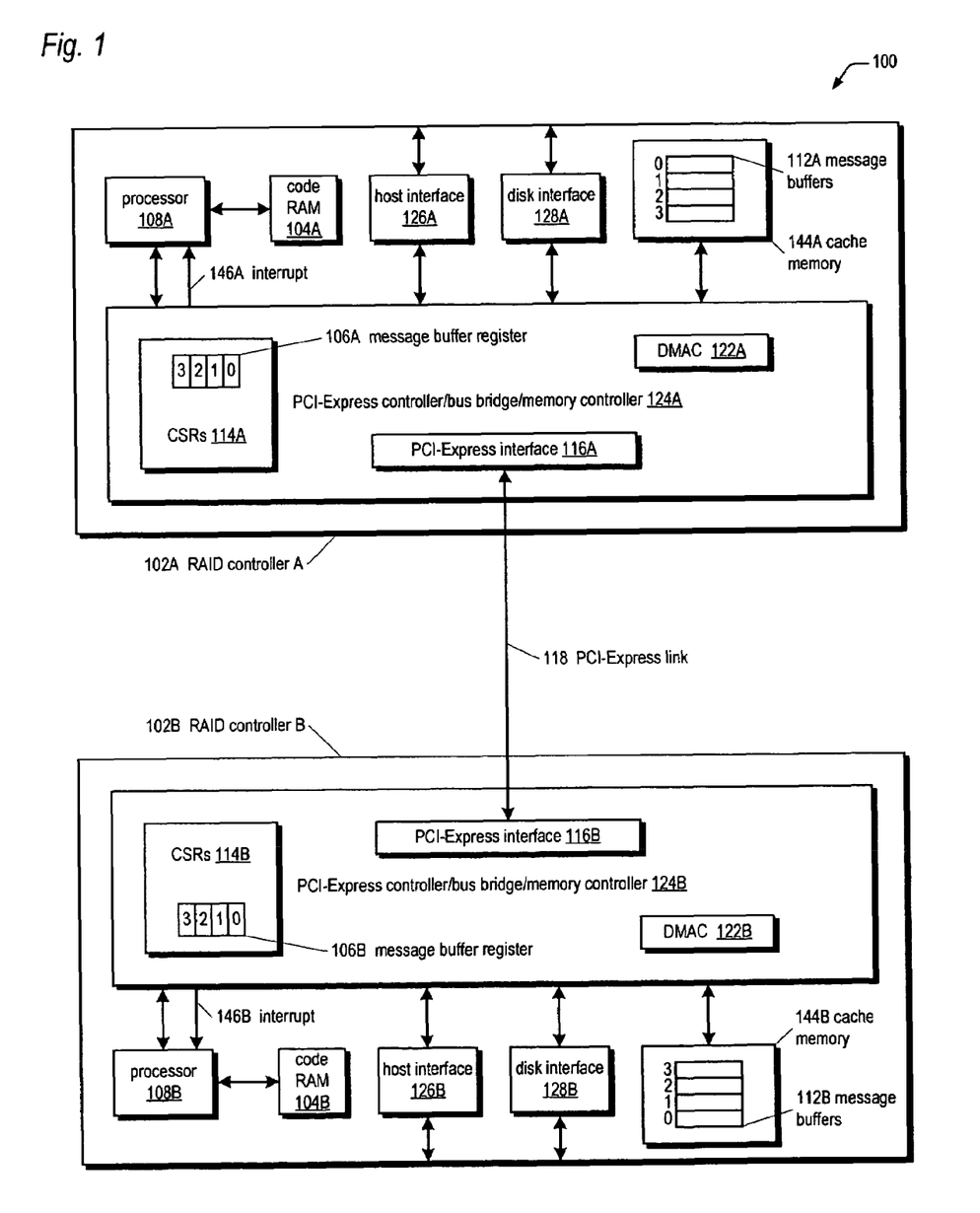
FIG. 1 is a block diagram illustrating an active-active redundant fault-tolerant RAID subsystem according to one embodiment of the present invention.

Referring now to FIG. 1, a block diagram illustrating an active-active redundant fault-tolerant RAID subsystem 100 according to one embodiment of the present invention is shown. The subsystem 100 includes two RAID controllers denoted individually RAID controller A 102A and RAID controller B 102B, generically as RAID controller 102, and collectively as RAID controllers 102. The RAID controllers 102 are coupled to one another by a PCI-Express link 118. In one embodiment, the PCI-Express link 118 comprises signal traces on a backplane or mid-plane of a chassis into which the RAID controllers 102 plug. In one embodiment, the RAID controllers 102 are hot-pluggable into the backplane.

The PCI-Express link 118 is an efficient high-speed serial link designed to transfer data between components within a computer system as described in the PCI Express Base Specification Revision 1.0a, Apr. 15, 2003. The PCI Express specification is managed and disseminated through the PCI Special Interest Group (SIG) found at www.pcisig.com. PCI-Express is a serial architecture that replaces the parallel bus implementations of the PCI and PCI-X bus specification to provide platforms with greater performance, while using a much lower pin count. A complete discussion of PCI Express is beyond the scope of this specification, but a thorough background and description can be found in the following books which are incorporated herein by reference for all purposes: *Introduction to PCI Express, A Hardware and Software Developer's Guide*, by Adam Wilen, Justin Schade, Ron Thornburg; *The Complete PCI Express Reference, Design Insights for Hardware and Software Developers*, by Edward Solari and Brad Congdon; and *PCI Express System Architecture*, by Ravi Budruk, Don Anderson, Tom Shanley; all of which are available at www.amazon.com.

Advantageously, embodiments of the system 100 of the present invention described herein utilize a PCI-Express link 118 to enable redundant fault-tolerant RAID controllers 102 to communicate by sending messages and data to one another. The PCI-Express link 118 used in the system 100 has the following advantages over legacy RAID system communications links such as Fibre Channel and SCSI: higher bandwidth, lower latency, lower cost, built-in error recovery and multiple retry mechanisms, and greater immunity to service interruptions since the link is dedicated for inter-processor communication rather than being shared with other functions such as storage device 1/0.

PCI-Express provides a load-store architecture by virtue of its pedigree as a local bus. Consequently, the programming model for PCI-Express controllers is lower level than Fibre Channel or SCSI controllers, which typically provide a relatively high level programming model. In particular, data flow over a PCI-Express link 118 is controlled by the initiating device. In contrast, data flow over Fibre Channel or SCSI is controlled by the target device. The present disclosure describes a system 100 and method in which the RAID controllers 102 communicate with one another via the PCI-Express link 118 to communicate messages, or commands, to one another in a queued fashion and particularly enables each RAID controller 102 to interrupt the other's processor efficiently. In particular, the RAID controllers 102 transmit PCI-Express memory write request transaction layer packets (TLP) that are modified relative to the PCI- Express standard to use predetermined bits of the TLP header in a non-standard fashion to indicate a request to interrupt the receiving processor and to efficiently communicate which of a plurality of message buffers a message was written to, as described in detail below.

Each of the RAID controllers 102 of FIG. 1 are identical and will be described generically; however, each element in FIG. 1 includes an A or B suffix on its reference numeral to indicate the element is part of RAID controller A 102A or RAID controller B 102B, respectively.

Each RAID controller includes a processor 108, or processor complex 108. The processor 108 may be any processor capable of executing stored programs, including but not limited to, for example, a processor and chipset, such as an x86 architecture processor and what are commonly referred to as a North Bridge or Memory Control Hub (MCH) and a South Bridge or I/O Control Hub (ICH), which includes I/O bus interfaces, such as an interface to an ISA bus or a PCI-family bus. In one embodiment, the processor complex 108 comprises a Transmeta TM8800 processor that includes an integrated North Bridge and an ALi M1563S South Bridge. In another embodiment, the processor 108 comprises an AMD Elan SC-520 microcontroller. In another embodiment, the processor 108 comprises an Intel Celeron M processor and an MCH and ICH.

Coupled to the processor 108 is random access memory (RAM) 104 from which the processor 108 executes stored programs. In one embodiment, the code RAM 104 comprises a double-data-rate (DDR) RAM, and the processor 108 is coupled to the DDR RAM 104 via a DDR bus.

Also coupled to the processor 108 is a PCI-Express controller/bus bridge/memory controller 124. In one embodiment, the processor 108 and PCI-Express controller/bus bridge/memory controller 124 are coupled by a local bus, such as a PCI, PCI-X, PCI-Express, or other PCI family local bus. Coupled to the PCI-Express controller/bus bridge/memory controller 124 are a cache memory 144, a host interface 126, and a disk interface 128. In one embodiment, the cache memory 144 comprises a DDR RAM coupled to the PCI-Express controller/bus bridge/memory controller 124 via a DDR bus. In one embodiment, the host interface 126 and disk interface 128 comprise PCI-X or PCI-Express devices coupled to the PCI-Express controller/bus bridge/memory controller 124 via respective PCI-X or PCI-Express buses. The cache memory 144 is used to buffer and cache user data as it is transferred between the host computers and the disk drives via the host interface 126 and disk interface 128, respectively.

In addition, the cache memory 144 is used to buffer messages and data received from the other RAID controller 102 via the PCI-Express link 118. In particular, the software executing on the processor 108 allocates a portion of the cache memory 144 to a plurality of message buffers 112. FIG. 1 illustrates four message buffers 112, denoted 0 through 3; however, it should be understood that other embodiments are contemplated in which the number of message buffers 112 is more or less than four, and the number of message buffers 112 may be tailored to the number of messages that a RAID controller 102 needs to queue up to the other RAID controller 102, to the rate at which the receiving RAID controller 102 is capable of processing received messages, and to the number of bits available for use as the message tag field 304 (shown in FIG. 3) in the memory write request TLP header, as described in more detail below. In one embodiment, each message buffer is 1056 bytes.

In one embodiment, each processor 108 allocates space for a set of send message buffers 112 and for a set of receive message buffers 112. The send message buffers 112 of one controller are located at the same location in cache memory 144 as the receive message buffers 112 on the other controller and vice versa. Consequently, the PCI-Express controller 124 is not required to perform memory address translation, but simply transfers data from an address in its cache memory 144 to the same address in the other RAID controller's 102 cache memory 144. In one embodiment, each message buffer 112 comprises a normal/acknowledge buffer pair. The normal buffer is used to send or receive normal messages, whereas the acknowledge buffer is used strictly to send or receive an acknowledge message to the other controller to acknowledge receipt of a normal message received in the paired buffer. In one embodiment, the send message buffers 112 are used by the processor 108 in a round-robin order and the processor 108 processes incoming messages in the receive message buffers 112 in sequential order.

The disk interface 128 interfaces the RAID controller 102 to disk drives or other mass storage devices, including but not limited to, tape drives, solid-state disks (SSD), and optical storage devices, such as CDROM or DVD drives. The disk drives store user data. The disk interface 128 may include, but is not limited to, the following interfaces: Fibre Channel, Small Computer Systems Interface (SCSI), Advanced Technology Attachment (ATA), Serial Attached SCSI (SAS), Serial Advanced Technology Attachment (SATA), Ethernet, Infiniband, HIPPI, ESCON, iSCSI, or FICON. The RAID controller 102 reads and writes data from or to the disk drives in response to I/O requests received from host computers.

The host interface 126 interfaces the RAID controller 102 with host computers. In one embodiment, the RAID controller 102 is a local bus-based controller, such as a controller that plugs into, or is integrated into, a local I/O bus of the host computer system, such as a PCI, PCI-X, Compact-PCI, PCI-Express, PCI-X2, EISA, VESA, VME, RapidIO, AGP, ISA, 3GIO, HyperTransport, Futurebus, MultiBus, or any other local bus. In this type of embodiment, the host interface 126 comprises a local bus interface of the local bus type. In another embodiment, the RAID controller 102 is a standalone controller in a separate enclosure from the host computers that issue I/O requests to the RAID controller 102. For example, the RAID controller 102 may be part of a storage area network (SAN). In this type of embodiment, the host interface 126 may comprise various interfaces such as Fibre Channel, Ethernet, InfiniBand, SCSI, HIPPI, Token Ring, Arcnet, FDDI, LocalTalk, ESCON, FICON, ATM, SAS, SATA, ISCSI, and the like.

The processor 108, host interface 126, and disk interface 128, read and write data from and to the cache memory 144 via the PCI-Express controller/bus bridge/memory controller 124. The processor 108 executes programs stored in the code RAM 104 that control the transfer of data between the disk drives and the hosts. The processor 108 receives commands from the hosts to transfer data to or from the disk drives. In response, the processor 108 issues commands to the disk interface 128 to accomplish data transfers with the disk drives. Additionally, the processor 108 provides command completions to the hosts via the host interface 126. The processor 108 may also perform storage controller functions such as RAID control, logical block translation, buffer management, and data caching.

The PCI-Express controller/bus bridge/memory controller 124 includes a PCI-Express interface 116 coupled to the PCI-Express link 118. The PCI-Express interface 116 performs the PCI-Express protocol on the PCI-Express link 118, including transmitting and receiving PCI-Express packets, such as PCI-Express TLPs and data link layer packets (DLLPs), and in particular memory write request TLPs, as described in more detail below. In one embodiment, with the exception of the interrupt request flag 302 and message tag 304 field and related functional modifications described herein, the PCI-Express interface 116 conforms to the PCI Express Base Specification Revision 1.0a, Apr. 15, 2003.

The PCI-Express controller/bus bridge/memory controller 124 also includes control and status registers (CSRs) 114 by which the processor 108 programs the PCI-Express controller/bus bridge/memory controller 124. The PCI-Express controller/bus bridge/memory controller 124 includes a direct memory access controller (DMAC) 122 that may be programmed to transfer data from its own cache memory 144 to the other RAID controller 102 cache memory 144 via the PCI-Express link 118. The data comprises messages, such as messages to facilitate redundant active-active fault-tolerant operation of the system 100. In some embodiments, the data may include user data, such as mirrored write cached data. In one embodiment, the CSRs 114 include an address register that the processor 108 programs with the address of the message in the cache memory 144. In another embodiment, the DMAC 122 is capable of transferring a series of physically discontiguous data chunks whose memory locations are specified by a scatter/gather list whose base address the processor 108 programs into the address register. In this embodiment, the DMAC 122 uses the scatter/gather list addressaength pairs to transmit multiple PCI-Express memory write request TLPs including the data chunks over the PCI-Express link 118 to the cache memory 144 of the other RAID controller 102. In one embodiment, each scatter/gather list element includes an interrupt request bit and message tag field. If the interrupt request bit in the scatter/gather list element is set, then the PCI-Express controller 124 populates the message tag field 304 and sets the interrupt request flag 302 of the TLP header 300 (shown in FIG. 3) whose data is described by the scatter/gather list element to cause the receiving processor 108 to be interrupted when the data chunk is written to the receiving RAID controller's 102 cache memory 144.

The CSRs 114 also include a message buffer register 106. The message buffer register 106 includes a bit corresponding to each of the message buffers 112. If a bit is set in the message buffer register 106 it indicates that the corresponding message buffer 112 contains a valid message. When the PCI-Express controller 124 receives a memory write request TLP on the PCI-Express link 118 with the interrupt request flag 302 set, it examines the predetermined message tag field 304 of the TLP header 300 (shown in FIG. 3) to determine to which of the message buffers 112 a message was written. If the memory write request TLP contains a message, the address of the message buffer 112 is specified in the address field of the TLP header; however, the message tag 304 enables the PCI-Express controller 124 to more efficiently determine which message buffer 112 is the destination of the message without having to decode the address field. Advantageously, the message buffer register 106 enables the processor 108 to quickly determine which of the message buffers 112 contain a valid message from the other RAID controller 102 without having to examine the contents of the message buffers 112 to determine which of them are valid. This is particularly efficient since a RAID controller 102 may send multiple messages to the other RAID controller 102 in a queued fashion. In one embodiment, the processor 108 clears a message buffer register 106 bit by writing a Boolean one to the bit.

The PCI-Express controller/bus bridge/memory controller 124 generates an interrupt signal 146 coupled to the processor 108. In one embodiment, the interrupt signal 146 is part of the local bus coupling the processor 108 and the PCI-Express controller/bus bridge/memory controller 124, such as a PCI interrupt signal. The PCI-Express controller 124 interrupts the processor 108 via the interrupt signal 146 in response to receiving a memory write request TLP having a set interrupt request flag 302 (shown in FIG. 3), as described in detail below. Advantageously, the interrupt request flag 302 enables the sending RAID controller 102 to interrupt the processor 108 of the receiving RAID controller 102 to inform the receiving processor 108 that it has received a message from the other RAID controller 102 without having to include a discrete interrupt line from the sending RAID controller 102 to the receiving RAID controller 102 processor 108, and without having to incur the overhead of sending a second TLP, such as a PCI message signaled interrupt (MSI), to interrupt the receiving processor 108. Additionally, it alleviates the PCI-Express controller 124 from including the complexity of sending and receiving MSIs. That is, the design complexity of the PCI-Express controller 124 may be significantly reduced. In one embodiment, the PCI-Express controller 124 is included on a highly complex single integrated circuit also including extensive circuitry for performing the bus bridge and memory controller functions; hence, the reduced design complexity and concomitant chip area reduction enjoyed by alleviating MSI support is potentially a significant advantage.

Having multiple message buffers 112 enables the transmitting RAID controller 102 to queue multiple messages to the other RAID controller 102 before receiving an acknowledgement. Consequently, when the receiving processor 108 services an interrupt, multiple messages may have been received from the sending RAID controller 102, particularly if the receiving processor 108 is busy servicing other higher priority events. The message buffer register 106 advantageously enables the processor 108 to quickly determine which of multiple message buffers 112 have valid messages.

Figure 2:
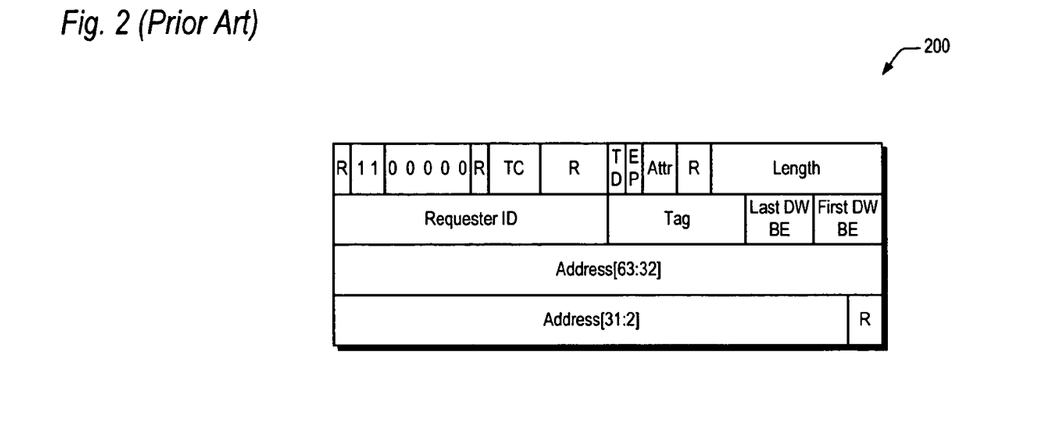
FIG. 2 is a block diagram illustrating a prior art PCI-Express memory write request transaction layer packet (TLP) header.

Referring now to FIG. 2, a block diagram illustrating a prior art PCI-Express memory write request transaction layer packet (TLP) header 200 is shown. The packet header 200 of FIG. 2 illustrates a standard four double word header with data format memory write request TLP header as specified by the current PCI Express Base Specification Revision 1.0a, Apr. 15, 2003. The header 200 includes four 32-bit double words. The first double word includes, from left to right: a reserved bit (R); a Boolean 11 value in the Format field denoting that the TLP header is four double word header with data format TLP; a Boolean 00000 value in the Type field to denote that the TLP includes a memory request and address routing is to be used; a reserved bit (R); a 3-bit Transaction Class (TC) field; four reserved bits (R); a TLP Digest bit (TD); a poisoned data (EP) bit; two Attribute (Attr) bits; two reserved bits (R); and ten Length bits specifying the length of the data payload. The second double word includes, from left to right: a 16 bit Requester ID field; a Tag field; a Last double word byte enable (DW BE) field; and a First double word byte enable (DW BE) field. The third double word includes a 32-bit Address field which specifies bits 63:32 of the destination memory address of the data payload. The fourth double word includes a 30-bit Address field which specifies bits 31:2 of the destination memory address of the data payload, followed by two reserved (R) bits.

Figure 3:
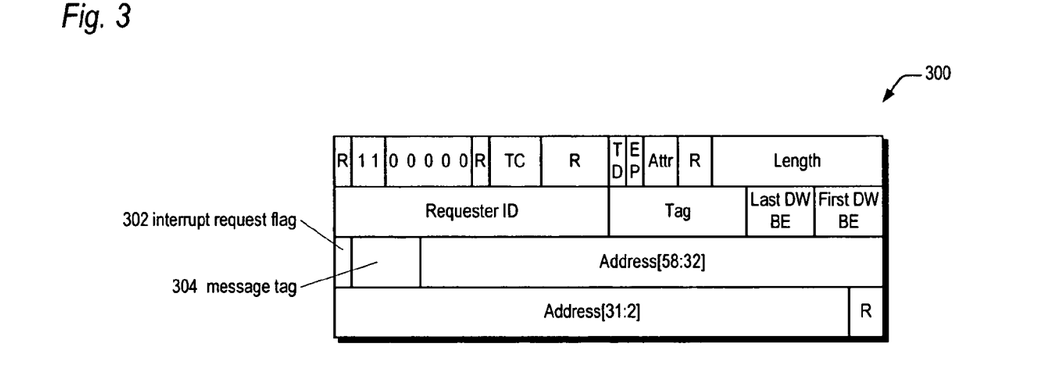
FIG. 3 is a block diagram illustrating a modified PCI-Express memory write request transaction layer packet (TLP) header according to the present invention.

Referring now to FIG. 3, a block diagram illustrating a modified PCI-Express memory write request transaction layer packet (TLP) header 300 according to the present invention is shown. The modified TLP packet header 300 is similar to the standard TLP packet header 200 of FIG. 2; however, the modified TLP packet header 300 includes an interrupt request flag 302 that occupies bit 63 of the Address field; and includes a message tag field 304 that occupies a plurality of bits in the Address field. In the embodiment of FIG. 3, the message tag 304 is 4 bits occupying bits 62:59 of the Address field. The Address field bits occupied by the interrupt request flag 302 and the message tag 304 are not interpreted by the PCI-Express controller 124 as part of the Address field. Rather, the Address field is shortened relative to the standard PCI-Express TLP header 200 of FIG. 200. Thus, the modified TLP packet header 300 of FIG. 3 reduces the memory address space that may be accessed by the RAID controllers 102 in the other RAID controller 102 in exchange for the capability to transfer data and interrupt the receiving processor 108 using a single TLP, and in exchange for the capability to queue multiple messages to multiple message buffers 112 and efficiently specify and detect to which of the message buffers 112 the queued messages have been written. A set interrupt request flag 302 instructs the PCI-Express controller 124 to interrupt 146 the processor 108 after writing the data payload of the TLP to the cache memory 144. A set interrupt request flag 302 also instructs the PCI-Express controller 124 to set the bit in the message buffer register 106 specified by the message tag 304 value before interrupting the processor 108.

Although FIG. 3 illustrates a 4-bit message tag 304 which provides for up to 16 distinct message buffers 112, it should be understood that the message tag 304 may occupy more or less bits to accommodate more or less message buffers 112 according to the needs of the system 100. Furthermore, although FIG. 3 illustrates using particular bits of the Address field for the interrupt request flag 302 and message tag 304, the invention is not limited to those particular bits; rather, other bits may be used, as described below.

Figure 4:
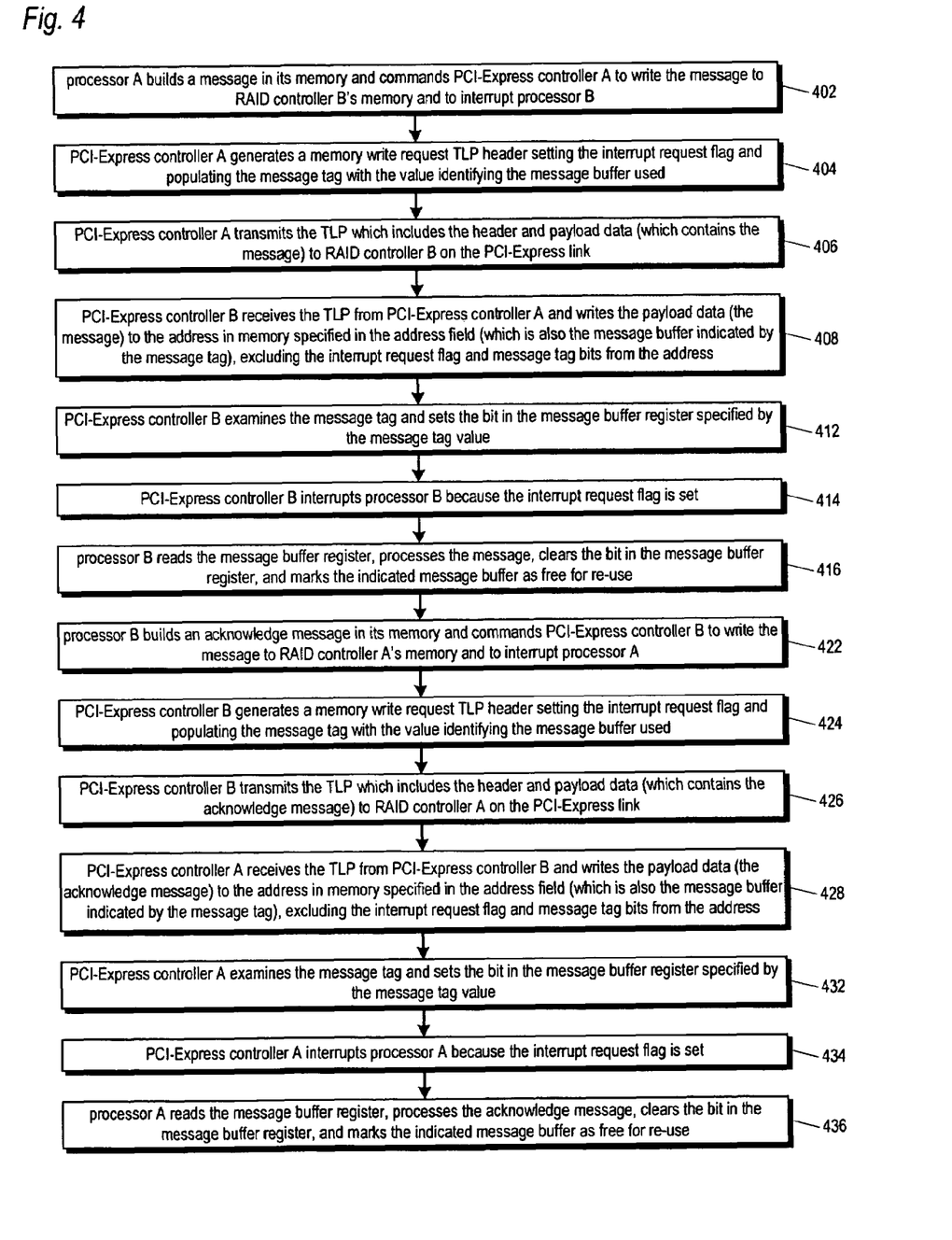
FIG. 4 is a flowchart illustrating operation of the system to send a simple message from one RAID controller to the other RAID controller according to the present invention.

Referring now to FIG. 4, a flowchart illustrating operation of the system 100 to send a simple message from one RAID controller 102 to the other RAID controller 102 according to the present invention is shown. The flowchart of FIG. 4 illustrates the process for transferring a message from one RAID controller 102 to the other and interrupting the processor 108 of the receiving RAID controller 102 using a single memory write request TLP via the interrupt request flag 302. Flow begins at block 402.

At block 402, processor A 108A builds a message in one of its message buffers 112A in its cache memory 144A and commands its PCI-Express controller 124A via the CSRs 114A to write the message to a message buffer 112B in the cache memory 144B of RAID controller B 102B via the PCI-Express link 118 and to interrupt the processor B 108B of RAID controller B 102B. Flow proceeds to block 404.

At block 404, PCI-Express controller 124A generates a modified PCI-Express memory write request TLP header 300 of FIG. 3 and sets the interrupt request flag 302 and populates the message tag 304 with a value identifying the message buffer 112 used to send and receive the message. Flow proceeds to block 406.

At block 406, PCI-Express controller 124A transmits the memory write request TLP on the PCI-Express link 118 to RAID controller B 102B. The memory write request TLP includes the message built at block 402 as its payload data and includes the modified header 300 built at block 404. In one embodiment, PCI-Express controller 124A interrupts processor A 108A when it has successfully transmitted a TLP. Flow proceeds to block 408.

At block 408, PCI-Express controller 124B receives the memory write request TLP on the PCI-Express link 118 and writes the payload data, which is the message built at block 402, to the address in its cache memory 144B specified in the address field of the memory write request TLP header 300, which is also the message buffer 112B indicated by the message tag 304 of the TLP header 300 built at block 404. As described above, the address field of the TLP header 300 excludes the interrupt request flag 302 and message tag 304 bits from the standard header 200 address field. Flow proceeds to block 412.

At block 412, PCI-Express controller 124B examines the message tag 304 and sets the bit in the message buffer register 106B specified by the message tag 304 value. Flow proceeds to block 414.

At block 414, PCI-Express controller 124B interrupts processor B 108B via interrupt signal 146B because the interrupt request flag 302 is set. Flow proceeds to block 416.

At block 416, processor B 108B reads the message buffer register 106B to determine which message buffers 112B contain a valid message and processes the message received at block 408. Additionally, processor B 108B clears the bit in the message buffer register 106B corresponding to the message buffer 112B in which the message was received, and marks the indicated message buffer 112B as free for re-use. The actions taken by processor B 108B to process the message depend upon the message type. In one embodiment, the simple messages include, but are not limited to, the messages described in Table 1 below. Flow proceeds to block 422.

TABLE 1

| | |
|---|---|
| CONTAINER_CLEAN | causes RAID controller receiving the message to synchronize its cache memory with the storage devices, i.e., to flush dirty cache data to the storage devices |
| HEARTBEAT | indicates to the receiving RAID controller that the sending RAID controller is functioning properly |
| LUN_INFO | used to exchange information regarding which RAID logical units are presented between controllers |
| RECONFIGURE | causes the receiving RAID controller to refresh the configuration data |
| LOCKMGR_GRANT/ LOCKMGR_REQUEST/ LOCKMGR_DENY_REQUEST | used to enable an inter-controller distributed lock manager to gain access to a shared resource |
| PAUSE_IO | temporarily pauses I/O operations with the storage devices |

TABLE 1-continued

| | |
|---|---|
| PAUSE_IO_REPLY | acknowledge that a PAUSE_IO message was received |
| UNPAUSE_IO | resume I/O operations with the storage devices |
| UNPAUSE_IO_REPLY | acknowledge that an UNPAUSE_IO message was received |
| START_FAILBACK | causes RAID controller receiving the message to begin failback processing |
| BOOT_HANDSHAKE | inter-controller message used during initialization to discover basic information about the other RAID controller, e.g., world-wide names, memory size, firmware level, etc. |
| BOOT_HANDSHAKE_REPLY | used with BOOT_HANDSHAKE to send reply data to the other RAID controller |
| ASYNCUPDATE_NOTIFICATION | used to notify the other RAID controller of I/O interface events |
| SHUTDOWN_REBOOT | causes RAID controller receiving the message to shutdown and reboot |
| SHUTDOWN_REBOOT_REPLY | acknowledge that a SHUTDOWN_REBOOT message was received |
| RAID_SEND_XFER_COMPLETE | used to invalidate RAID Data Logs on the other RAID controller |
| GENERIC_SEND_DATA | used to synchronize time between the RAID controllers and to send a pointer to mirrored configuration data (the actual mirrored configuration data is sent via a non-cache data type message) |

At blocks 422 through 436, processor B 108B and PCI-Express controller 124B send PCI-Express controller 124A and processor A 108A an acknowledgment message via the PCI-Express link 118 to acknowledge receipt of the simple message in a similar fashion in which processor A 108A sent the simple message at blocks 402 through 416. The interrupt request flag 302 and message tag 304 are used at block 422 through 436 in a manner similar to their use at blocks 402 through 416. Flow ends at block 436.

Advantageously, as may be observed from FIG. 4, the interrupt request flag 302 is employed to accomplish the transfer of both a message and an interrupt request in a single memory write request TLP transmission over the PCI-Express link 118, which is less than the two TLP packets that would have to be transmitted over the PCI-Express link 118 using standard PCI-Express protocol, i.e., one TLP packet in order to transfer the message and a second TLP packet to transmit a PCI-Express message signaled interrupt (MSI). Thus, the method of the present invention makes more efficient use of precious resources, namely PCI-Express link 118 bandwidth and processor 108 bandwidth. Additionally, the interrupt request flag 302 is employed to accomplish the transfer of both a message and an interrupt request in a single memory write request.TLP transmission over the PCI-Express link 118, which eliminates the need for dedicated interrupt request lines between the two processors 108.

Figure 5:
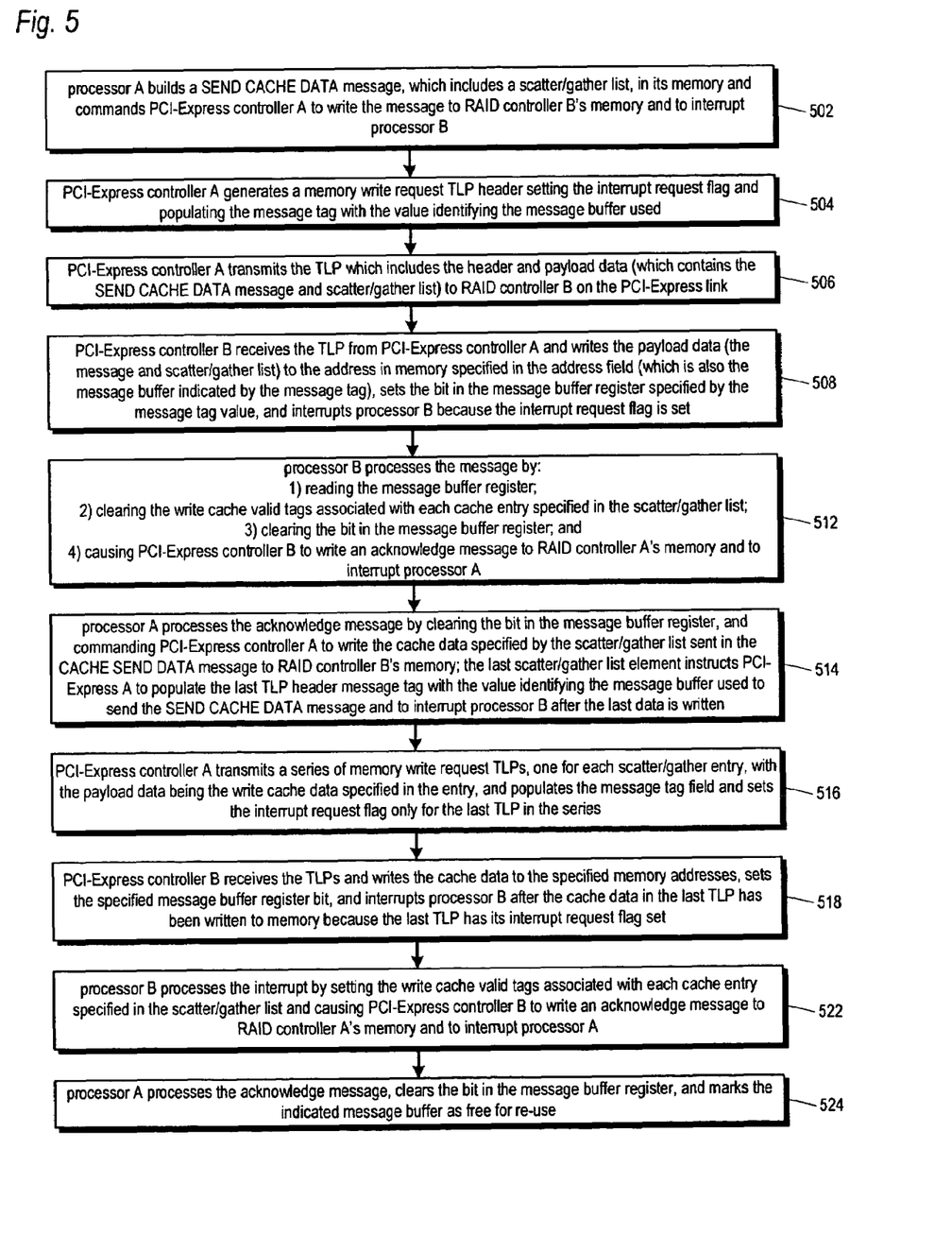
FIG. 5 is a flowchart illustrating operation of the system to send a SEND CACHE DATA message and associated mirrored write cache data from one RAID controller to the other RAID controller according to the present invention.

Referring now to FIG. 5, a flowchart illustrating operation of the system 100 to send a SEND CACHE DATA message and associated mirrored write cache data from one RAID controller 102 to the other RAID controller 102 according to the present invention is shown. In the embodiment of FIG. 5, RAID controller A 102A has received an I/0 write request from a host computer. In response, RAID controller A 102A writes the mirrored write cache data to RAID, controller B 102B and then sends a good completion status to the host computer for the I/O write request before the write data is actually written to the storage devices. Consequently, if RAID controller A 102A fails, RAID controller B 102B detects the failure of RAID controller A 102A and subsequently writes the write cache data to the storage device for failed RAID controller A 102A. Flow begins at block 502.

At block 502, processor A 108A builds a SEND CACHE DATA message in one of its message buffers 112A in its cache memory 144A and commands its PCI-Express controller 124A via the CSRs 114A to write the message to a message buffer 112B in the cache memory 144B of RAID controller B 102B via the PCI-Express link 118 and to interrupt the processor B 108B of RAID controller B 102B. The message in the message buffer 112 includes a scatter/gather list that describes the address and length of each chunk of the write cache data to be written to RAID controller B 102B. Flow proceeds to block 504.

At block 504, PCI-Express controller 124A generates a modified PCI-Express memory write request TLP header 300 of FIG. 3 and sets the interrupt request flag 302 and populates the message tag 304 with a value identifying the message buffer 112 used to send and receive the message. Flow proceeds to block 506.

At block 506, PCI-Express controller 124A transmits the memory write request TLP on the PCI-Express link 118 to RAID controller B 102B. The memory write request TLP includes the SEND CACHE DATA message built at block 502 as its payload data and includes the modified header 300 built at block 504. Flow proceeds to block 508.

At block 508, PCI-Express controller 124B receives the memory write request TLP on the PCI-Express link 118 and writes the payload data, which is the SEND CACHE DATA message and scatter/gather list built at block 502, to the address in its cache memory 144B specified in the address field of the memory write request TLP header 300, which is also the message buffer 112B indicated by the message tag 304 of the TLP header 300 built at block 504. Because the interrupt request flag 302 is set, PCI-Express controller 124B examines the message tag 304 and sets the bit in the message buffer register 106B specified by the message tag 304 value. PCI-Express controller 124B also interrupts the processor B 108B via interrupt signal 146B because the interrupt request flag 302 is set. Flow proceeds to block 512.

At block 512, processor B 108B responds to the interrupt by reading the message buffer register 106B to determine which message buffers 112B contain a valid message and processes the message received at block 508. In particular, processor B 108B clears write cache valid tags associated with each entry specified in the scatter/gather list to indicate that the cache buffers are currently invalid. Additionally, processor B 108B clears the bit in the message buffer register 106B corresponding to the message buffer 112B in which the message was received. Finally, processor B 108B commands the PCI-Express controller 124B to write an acknowledge message to RAID controller A 102A and to interrupt processor A 108A, similar to the steps at blocks 422 through 426 of FIG. 4. Flow proceeds to block 514.

At block 514, processor A 108A receives the acknowledge message from processor B 108B and responds by clearing the bit in the message buffer register 106A corresponding to the message buffer 112A in which the acknowledge message was received. Additionally, processor A 108A commands PCI-Express controller 124A to write the write cache data specified by the scatter/gather list to RAID controller B 102B cache memory 144B. The last scatter/gather list element instructs PCI-Express controller 124A to interrupt processor B 108B when the last data is written and identifies the message buffer 112 used at block 504 to transmit the SEND CACHE DATA message to enable the PCI-Express controller 124A to populate the message tag 304 of the last memory write request TLP therewith. In one embodiment, processor A 108A programs PCI-Express controller 124A with the base address of the scatter/gather list in its cache memory 144A and PCI-Express controller 124A accesses the scatter/gather list as needed to build the memory write request TLPs to transfer the write cache data described below with respect to block 516. Flow proceeds to block 516.

At block 516, PCI-Express controller 124A transmits a series of memory write request TLPs on the PCI-Express link 118 to RAID controller B 102B. In one embodiment, the series consists of one memory write request TLP for each scatter/gather list entry. The TLP payload data is the write cache data specified by the scatter/gather list entry address and length. In particular, PCI-Express controller 124A populates the message tag 304 and sets the interrupt request flag 302 only in the header of the last memory write request TLP for the last scatter/gather list entry. Flow proceeds to block 518.

At block 518, PCI-Express controller 124B receives each memory write request TLP in the series and writes the write cache data to the specified location in its cache memory 144B. When PCI-Express controller 124B has written the write cache data for the last TLP, PCI-Express controller 124B sets the specified bit in the message buffer register 106B and interrupts processor B 108B because the interrupt request flag 302 is set. Flow proceeds to block 522.

At block 522, processor B 108B processes the interrupt by setting the write cache valid tags associated with each scatter/gather list entry to indicate that the cache buffers are currently valid. Additionally, processor B 108B commands PCI-Express controller 124B to write an acknowledge message to RAID controller A 102A to acknowledge receipt of the write cache data and to interrupt processor A 108A. Flow proceeds to block 524.

At block 524, processor A 108A receives the acknowledge message from processor B 108B and responds by clearing the bit in the message buffer register 106A corresponding to the message buffer 112A in which the acknowledge message was received and marking the indicated message buffer 112A as free for re-use. Flow ends at block 524.

As may be observed from FIG. 5, the RAID controller A 102A guarantees the coherency of the write cache data by waiting for an acknowledgement of the CACHE SEND DATA message—which causes processor B 108B to clear the write cache valid tags—before transmitting the write cache data. Additionally, to increase data availability, RAID controller A 102A does not notify the host computer that the cached write operation is complete until receiving an acknowledgement that the write cache data was successfully written to the RAID controller B 102B cache memory 144B and marked as valid.

Advantageously, as may be observed from FIG. 5, the embodiment described reduces the number of TLPs transmitted over the PCI-Express link 118 by at least two over a method using an MSI since the interrupt request flag 302 is employed to interrupt the receiving processor 108 when the SEND CACHE DATA message memory write request TLP is transmitted and when the last scatter/gather list entry worth of write cache data TLP is transmitted via the PCI-Express link 118.

Figure 6:
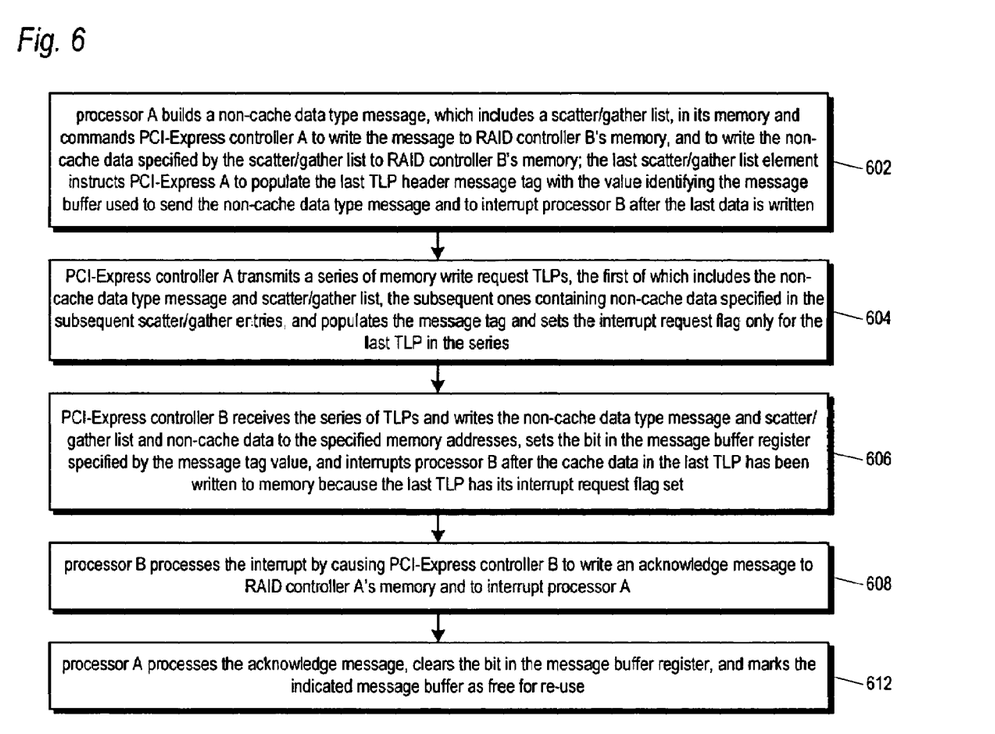
FIG. 6 is a flowchart illustrating operation of the system to send a non-cache data type message and associated non-cache data according to the present invention.

Referring now to FIG. 6, a flowchart illustrating operation of the system 100 to send a non-cache data type message and associated non-cache data according to the present invention is shown. The flowchart of FIG. 6 illustrates the process for transferring messages from one RAID controller 102 to the other, wherein the messages have data associated with them that may be larger than will fit in a single message buffer 112, but which is not user data such as the mirrored write cache data discussed above with respect to FIG. 5. In one embodiment, the non-cache data type messages include, but are not limited to, messages used to send relatively large amounts of configuration data or RAID data logs between the RAID controllers 102. Flow begins at block 602.

At block 602, processor A 108A builds a non-cache data type message in one of its message buffers 112A in its cache memory 144A. The message in the message buffer 112A includes a scatter/gather list that describes the address and length of each chunk of the non-cache data to be written to RAID controller B 102B. The first scatter/gather list element specifies the address and length of the non-cache data type message itself in the message buffer 112A, but does not instruct the PCI-Express controller 124A to interrupt processor B 108B. The last scatter/gather list element identifies the message buffer 112A containing the non-cache data type message and instructs the PCI-Express controller 124A to interrupt processor B 108B when the last data has been written. Processor A 108A then commands its PCI-Express controller 124A via the CSRs 114A to write the data specified by the scatter/gather list to RAID controller B 102B cache memory 144B via the PCI-Express link 118. In particular, the data specified by the scatter/gather list comprises the non-cache data type message and the scatter/gather list, which are destined for the message buffer 112B of RAID controller B 102B, and the non-cache data specified by the scatter/gather list. In one embodiment, processor A 108A programs PCI-Express controller 124A with the base address of the scatter/gather list in its cache memory 144A and PCI-Express controller 124A accesses the scatter/gather list as needed to build the memory write request TLPs to transfer the non-cache data type message and non-cache data described below with respect to blocks 604 and 608. Flow proceeds to block 604.

At block 604, PCI-Express controller 124A transmits a series of memory write request TLPs on the PCI-Express link 118 to RAID controller B 102B. The first memory write request TLP contains in its payload the non-cache data type message and the scatter/gather list. The subsequent memory write request TLPs contain in their payloads the non-cache data specified by the subsequent scatter/gather list entries. PCI-Express controller 124A populates the last memory write request TLP with the message tag 304 and sets the interrupt request flag 302 as instructed by the last scatter/gather list entry. Flow proceeds to block 606.

At block 606, PCI-Express controller 124B receives the series of memory write request TLPs on the PCI-Express link 118 and writes the payload data to the specified addresses in its cache memory 144B, which for the first memory write request TLP is the non-cache data type message and scatter/gather list built at block 602, and which for the subsequent memory write request TLPs is the non-cache data. In response to the last memory write request TLP, PCI-Express controller 124B examines the message tag 304 and sets the bit in the message buffer register 106B specified by the message tag 304 value. PCI-Express controller 124B then interrupts the processor B 108B via interrupt signal 146B because the interrupt request flag 302 is set. Flow proceeds to block 608.

At block 608, processor B 108B processes the interrupt by commanding PCI-Express controller 124B to write an acknowledge message to RAID controller A 102A to acknowledge receipt of the non-cache data type message and associated non-cache data and to interrupt processor A 108A, similar to the steps performed at blocks 416 and 422 of FIG. 4. Flow proceeds to block 612.

At block 612, processor A 108A receives the acknowledge message from processor B 108B and responds by clearing the bit in the message buffer register 106A corresponding to the message buffer 112A in which the acknowledge message was received and marking the indicated message buffer 112A as free for re-use. Flow ends at block 612.

Advantageously, as may be observed from FIG. 6, the embodiment described reduces the number of TLPs transmitted over the PCI-Express link 118 by at least one over a method using an MSI since the interrupt request flag 302 is employed to interrupt the receiving processor 108 when the last scatter/gather list entry worth of non-cache data memory write request TLP is transmitted via the PCI-Express link 118.

Although the present invention and its objects, features, and advantages have been described in detail, other embodiments are encompassed by the invention. For example, although embodiments have been described in which the interrupt request flag bit is the highest bit in the address field of the TLP header, other bits of the address field may be used for the interrupt request flag. Similarly, other bits in the address field may be used for the message tag than those used in the embodiments shown. Additionally, although embodiments are shown in which the TLP has a 4 double word header with data format, address bits in a 3 double word header with data format TLP may be used for the interrupt request flag and/or message tag if the amount of cache memory to be addressed is small enough to be addressed by 32 bits less the number used for the interrupt request flag and message tag. What is important is that the bits used for the interrupt request and message tag are bits in the address field that are not needed for addressing memory in the receiving RAID controller and that the bits chosen be predetermined so that the PCI-Express controller may be configured to interpret the predetermined bits as the interrupt request flag bit and message tag bits.

Furthermore, other embodiments are contemplated in which the interrupt request flag bit and the message tag bits are located in unneeded bits of fields of the TLP header other than the address field. For example, one or more of the reserved fields in the TLP header could be used for the interrupt request flag bit and the message tag bits. For another example, the system designer could decide not to support data poisoning and utilize the EP bit in the TLP header as the interrupt request flag. Similarly, the system designer could decide not to support TLP digests and utilize the TD bit in the TLP header as the interrupt request flag. Similarly, the system designer could decide not to support differentiated service classes or to support only a subset thereof and utilize the surplus TC bits in the TLP header as the interrupt request flag and/or message tag. Similarly, the system designer could decide not to support relaxed ordering and/or hardware coherency management and utilize one or both of the attribute bits in the TLP header as the interrupt request flag or message tag. Similarly, the system designer could decide to require data transfers to be located on dword boundaries and utilize the bits in one or both of the byte enable fields of the TLP header as the interrupt request flag and/or message tag. Similarly, the system designer could decide to support less than the maximum number of outstanding requests and utilize unneeded bits in the tag field and/or function number field of the transaction ID of the TLP header as the interrupt request flag and/or message tag. Again, what is important is that the bits used for the interrupt request and message tag are bits that are not needed for standard PCI-Express functions and that the bits chosen be predetermined so that the PCI-Express controller may be configured to interpret the predetermined bits as the interrupt request flag bit and message tag bits.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for a first redundant array of inexpensive disks (RAID) controller to transfer data to a second RAID controller over a PCI-Express link via a PCI-Express memory write request transaction layer packet (TLP) and to also communicate an interrupt request to a processor of the second RAID controller via the address field of the header of the TLP, the method comprising:

receiving the memory write request TLP, by a PCI-Express controller of the second RAID controller, from the first RAID controller via the PCI-Express link;

interpreting, by the PCI-Express controller, a predetermined address bit of the address field of the TLP header as an interrupt request flag rather than as an address bit;

determining, by the PCI-Express controller, whether the interrupt request flag is a predetermined value; and interrupting the processor, by the PCI-Express controller, if the interrupt request flag is the predetermined value.

2. The method of claim 1, further comprising:

refraining from interrupting the processor, by the PCI-Express controller, if the interrupt request flag is other than the predetermined value.

3. The method of claim 1, further comprising:

writing, by the PCI-Express controller, the data of the TLP into a memory of the second RAID controller at a location specified by an address in the address field, wherein the address excludes the predetermined bit.

4. The method of claim 1, further comprising:

transmitting, by the PCI-Express controller, a second memory write request TLP to the first RAID controller via the PCI-Express link, for acknowledging receipt of the first memory write request TLP.

5. The method of claim 4, further comprising:
receiving the second memory write request TLP, by a PCI-Express controller of the first RAID controller, from the second RAID controller via the PCI-Express link;
interpreting, by the PCI-Express controller of the first RAID controller, the predetermined address bit of the address field of the TLP header as the interrupt request flag rather than as an address bit;
determining, by the PCI-Express controller of the first RAID controller, whether the interrupt request flag is the predetermined value; and
interrupting a processor of the first RAID controller, by the PCI-Express controller of the first RAID controller, if the interrupt request flag is the predetermined value.

6. The method of claim 1, wherein the PCI-Express memory write request TLP has a 4 double word header with data format, wherein the predetermined bit is bit 63 of the address field.

7. The method of claim 1, wherein the PCI-Express memory write request TLP has a 4 double word header with data format, wherein the predetermined bit is one of bits 63 through 32 of the address field.

8. The method of claim 1, wherein the PCI-Express memory write request TLP has a 3 double word header with data format, wherein the predetermined bit is bit 31 of the address field.

9. The method of claim 1, wherein the PCI-Express memory write request TLP has a 3 double word header with data format, wherein the predetermined bit is one of bits 31 through 16 of the address field.

10. The method of claim 1, wherein the first and second RAID controllers operate as an active-active redundant pair.

11. The method of claim 1, further comprising:
interpreting, by the PCI-Express controller, a predetermined plurality of address bits of the address field of the TLP header as a message tag rather than as address bits, wherein a value of the message tag indicates one of a plurality of message buffers of the second RAID controller, wherein the TLP data is a message;
writing, by the PCI-Express controller, the message into the one of the plurality of message buffers indicated by the message tag value; and
updating a register of the PCI-Express controller to indicate the one of the plurality of message buffers specified by the message tag value, prior to said interrupting the processor.

12. The method of claim 11, wherein the predetermined address bit and the predetermined plurality of address bits are mutually exclusive.

13. The method of claim 11, wherein said writing by the PCI-Express controller the message into the one of the plurality of message buffers comprises writing the message into a memory of the second RAID controller at a location specified by an address in the address field, wherein the address excludes the predetermined bit and the predetermined plurality of bits.

14. The method of claim 11, wherein the plurality of message buffers are comprised in a first memory of the second RAID controller distinct from a second memory of the second RAID controller, wherein the second memory is directly coupled to the processor for storing program instructions executed by the processor.

15. The method of claim 11, further comprising:
reading the register, by the processor, after said updating the register, to determine the one of the plurality of message buffers into which the message was written.

16. The method of claim 11, further comprising:
transmitting, by the PCI-Express controller, a second memory write request TLP to the first RAID controller via the PCI-Express link, after said interrupting the processor, for acknowledging receipt of the first memory write request TLP.

17. The method of claim 16, further comprising:
receiving a plurality of memory write request TLPs, by the PCI-Express controller, from the first RAID controller via the PCI-Express link, prior to said transmitting by the PCI-Express controller the second memory write request TLP for acknowledging receipt of the first memory write request TLP, wherein each of the plurality of memory write request TLPs has a unique value of the message tag.

18. The method of claim 17, further comprising:
writing, by the PCI-Express controller, the message of each of the plurality of memory write request TLPs into a plurality of the plurality of message buffers indicated by the message tag value of each of the respective plurality of memory write request TLPs.

19. The method of claim 18, further comprising:
updating the register to indicate each of the plurality of the plurality of message buffers specified by the message tag values.

20. The method of claim 19, further comprising:
reading the register, by the processor, after said updating the register to indicate each of the plurality of the plurality of message buffers specified by the message tag values, to determine each of the plurality of the plurality of message buffers into which the messages were written.

21. The method of claim 20, further comprising:
transmitting, by the PCI-Express controller, a second plurality of memory write request TLPs to the first RAID controller via the PCI-Express link, for acknowledging receipt of the first plurality of memory write request TLPs.

22. The method of claim 11, wherein the message comprises a heartbeat for informing the second RAID controller that the first RAID controller is operating properly.

23. The method of claim 11, wherein the message comprises information specifying a configuration of storage devices coupled to and controlled by the first RAID controller.

24. The method of claim 11, wherein the message comprises a command from the first RAID controller to the second RAID controller to begin a failback operation.

25. The method of claim 11, wherein the message comprises a command from the first RAID controller to the second RAID controller to temporarily pause I/O operations with storage devices coupled to and controlled by the second RAID controller.

26. The method of claim 11, wherein the message comprises a command from the first RAID controller to the second RAID controller to resume I/O operations with storage devices coupled to and controlled by the second RAID controller.

27. The method of claim 11, wherein the message comprises a command from the first RAID controller to the second RAID controller to reboot.

28. The method of claim 11, wherein the message comprises a command from the first RAID controller to the second RAID controller to synchronize a cache memory of the second RAID controller with storage devices coupled to and controlled by the second RAID controller.

29. The method of claim 11, wherein the message comprises a command from the first RAID controller to the second RAID controller to refresh information specifying a configuration of storage devices coupled to and controlled by the RAID controllers.

30. The method of claim 11, wherein the message comprises a message to notify the second RAID controller of an event occurring on an I/O interface of the first RAID controller.

31. The method of claim 11, wherein the message comprises information indicating one or more cache memory locations of the second RAID controller into which the first RAID controller will subsequently transfer mirrored write cache data.

32. The method of claim 31, further comprising:
clearing valid indicators, by the second RAID controller, associated with each of the cache memory locations, in response to the message, before the first RAID controller transfers the mirrored write cache data.

33. The method of claim 32, further comprising:
transferring, by the first RAID controller, the mirrored write cache data to the second RAID controller in one or more TLPs via the PCI-Express link, after said clearing the valid indicators.

34. The method of claim 33, further comprising:
setting valid indicators, by the second RAID controller, associated with each of the cache memory locations, after said transferring the mirrored write cache data.

35. The method of claim 11, wherein the message comprises information indicating one or more memory locations of the second RAID controller into which the first RAID controller will subsequently transfer data.

36. The method of claim 35, wherein the data comprises RAID data log information.

37. The method of claim 35, wherein the data comprises user input information.

38. The method of claim 11, wherein the PCI-Express memory write request TLP has a 4 double word header with data format, wherein the predetermined plurality of bits is a plurality of bits 63 through 32 of the address field.

39. The method of claim 11, wherein the PCI-Express memory write request TLP has a 3 double word header with data format, wherein the predetermined plurality of bits is a plurality of bits 31 through 16 of the address field.

40. The method of claim 1, further comprising:
programming, by a processor of the first RAID controller, a PCI-Express controller of the first RAID controller to transmit the memory write request TLP to the second RAID controller via the PCI-Express link.

41. The method of claim 40, wherein said programming comprises:
providing a scatter/gather list of entries specifying data to be transferred to the second RAID controller via the PCI-Express link, wherein the memory write request TLP contains data specified by one of the scatter/gather list entries.

42. The method of claim 41, wherein the scatter/gather list entries indicate whether or not to set the interrupt request flag to the predetermined value.

43. A system wherein processors of redundant array of inexpensive disks (RAID) controllers communicate via a PCI-Express link using a PCI-Express memory write request transaction layer packet (TLP) having an address field within a header of the TLP, the system comprising:
a PCI-Express link;
a first RAID controller, having a first PCI-Express controller coupled to said PCI-Express link, and a first processor configured to cause said first PCI-Express controller to transmit on said PCI-Express link a PCI-Express memory write request TLP, wherein said processor is configured to cause said first PCI-Express controller to selectively set a predetermined address bit of the address field of the TLP header to a predetermined value as an interrupt request flag rather than as an address bit; and
a second RAID controller, having a second processor, and a second PCI-Express controller coupled to said PCI-Express link, configured to receive the TLP from said first RAID controller, and to interrupt said second processor if said interrupt request flag is said predetermined value.

44. The system of claim 43, wherein each of said first and second RAID controllers further comprises:
a memory, coupled to said PCI-Express controller;
wherein said second PCI-Express controller is configured to write the data of the TLP into said memory of said second RAID controller at a location specified by an address in the address field, wherein said address excludes the predetermined bit.

45. The system of claim 43, wherein the PCI-Express memory write request TLP has a 4 double word header with data format, wherein said predetermined bit is bit 63 of the address field.

46. The system of claim 43, wherein the PCI-Express memory write request TLP has a 4 double word header with data format, wherein said predetermined bit is one of bits 63 through 32 of the address field.

47. The system of claim 43, wherein the PCI-Express memory write request TLP has a 3 double word header with data format, wherein said predetermined bit is bit 31 of the address field.

48. The system of claim 43, wherein the PCI-Express memory write request TLP has a 3 double word header with data format, wherein said predetermined bit is one of bits 31 through 16 of the address field.

49. The system of claim 43, wherein said second PCI-Express controller is further configured to interpret a predetermined plurality of address bits of the address field of the TLP header as a message tag rather than as address bits, wherein a value of said message tag indicates one of a plurality of message buffers of said second RAID controller, wherein the TLP data is a message, wherein said second PCI-Express controller is further configured to write said message into said one of said plurality of message buffers indicated by said message tag value, wherein said second PCI-Express controller is further configured to update a register to indicate said one of said plurality of message buffers specified by said message tag value, prior to interrupting the processor.

50. The system of claim 49, wherein said second PCI-Express controller writes the message into a memory of said second RAID controller at a location specified by an address in the address field, wherein said address excludes the predetermined bit and the predetermined plurality of bits.

51. The system of claim 49, wherein said second processor is configured to read said register, after updating said register, to determine said one of said plurality of message buffers into which said message was written.

52. The system of claim 51, wherein said second PCI-Express controller is further configured to receive a plurality of memory write request TLPs from said first RAID controller via said PCI-Express link, prior to transmitting a second memory write request TLP for acknowledging receipt of said first memory write request TLP, wherein each of said plurality of memory write request TLPs has a unique value of said message tag.

53. The system of claim 52, wherein said second PCI-Express controller is further configured to update said register to indicate each of said plurality of said plurality of message buffers specified by said message tag values.

54. The system of claim 53, wherein said second processor is further configured to read said register, after updating said register, to determine each of said plurality of said plurality of message buffers into which said messages were written.

55. The system of claim 49, wherein the message comprises a command from said first RAID controller to said second RAID controller to begin a failback operation.

56. The system of claim 49, wherein said message comprises information indicating one or more cache memory locations of said second RAID controller into which said first RAID controller will subsequently transfer mirrored write cache data.

57. The system of claim 56, wherein said second RAID controller is configured to clear valid indicators associated with each of said cache memory locations, in response to said message, before said first RAID controller transfers said mirrored write cache data.

58. The system of claim 57, wherein said second RAID controller is further configured to set said valid indicators after transferring said mirrored write cache data.

59. The system of claim 49, wherein the PCI-Express memory write request TLP has a 4 double word header with data format, wherein said predetermined plurality of bits is a plurality of bits 63 through 32 of the address field.

60. The system of claim 49, wherein the PCI-Express memory write request TLP has a 3 double word header with data format, wherein said predetermined plurality of bits is a plurality of bits 31 through 16 of the address field.

61. The system of claim 43, wherein said first processor is configured to program said first PCI-Express controller to transmit said memory write request TLP to said second RAID controller via said PCI-Express link.

62. A method for a first redundant array of inexpensive disks (RAID) controller to transfer data to a second RAID controller over a PCI-Express link via a PCI-Express memory write request transaction layer packet (TLP) and to also communicate an interrupt request to a processor of the second RAID controller via the header of the TLP, the method comprising:
   receiving the memory write request TLP, by a PCI-Express controller of the second RAID controller, from the first RAID controller via the PCI-Express link;
   interpreting, by the PCI-Express controller, a predetermined unused bit of the TLP header as an interrupt request flag rather than as the bit's standard function specified in the PCI-Express specification;
   writing, by the PCI-Express controller, payload data of the TLP into a memory of the second RAID controller at a location specified by an address in the TLP header;
   determining, by the PCI-Express controller, whether the interrupt request flag is a predetermined value; and
   interrupting the processor, by the PCI-Express controller, if the interrupt request flag is the predetermined value.

63. The method of claim 62, wherein the unused bit comprises one of the Traffic Class (TC) bits specified by the PCI-Express specification.

64. The method of claim 62, wherein the unused bit comprises the TLP Digest (TD) bit specified by the PCI-Express specification.

65. The method of claim 62, wherein the unused bit comprises the data poisoning (EP) bit specified by the PCI-Express specification.

66. The method of claim 62, wherein the unused bit comprises one of the Transaction Descriptor Attributes field bits specified by the PCI-Express specification.

67. The method of claim 62, wherein the unused bit comprises one of the bits of the tag field of the transaction ID specified by the PCI-Express specification.

68. The method of claim 62, wherein the unused bit comprises one of the bits of the function number field of the transaction ID specified by the PCI-Express specification.

69. The method of claim 62, wherein the unused bit comprises one of the byte enable field bits specified by the PCI-Express specification.

70. The method of claim 62, further comprising:
   interpreting, by the PCI-Express controller, a predetermined unused plurality of bits of the TLP header as a message tag rather than as the bits' standard function specified in the PCI-Express specification, wherein a value of the message tag indicates one of a plurality of message buffers of the second RAID controller, wherein the TLP data is a message;
   writing, by the PCI-Express controller, the message into the one of the plurality of message buffers indicated by the message tag value; and
   updating a register of the PCI-Express controller to indicate the one of the plurality of message buffers specified by the message tag value, prior to said interrupting the processor.

71. The method of claim 70, wherein the unused plurality of bits comprise a plurality of the bits Reserved by the PCI-Express specification.

72. The method of claim 70, wherein the unused plurality of bits comprise a plurality of the Traffic Class (TC) bits specified by the PCI-Express specification.

73. The method of claim 70, wherein the unused plurality of bits comprise the Transaction Descriptor Attributes field bits specified by the PCI-Express specification.

74. The method of claim 70, wherein the unused plurality of bits comprise a plurality of the bits of the tag field of the transaction ID specified by the PCI-Express specification.

75. The method of claim 70, wherein the unused plurality of bits comprise a plurality of the bits of the function number field of the transaction ID specified by the PCI-Express specification.

76. The method of claim 70, wherein the unused plurality of bits comprise a plurality of the byte enable field bits specified by the PCI-Express specification.

77. The method of claim 62, wherein the unused bit comprises a bit Reserved by the PCI-Express specification.

78. A system wherein processors of redundant array of inexpensive disks (RAID) controllers transfer data with one another via a PCI-Express link using a PCI-Express memory write request transaction layer packet (TLP) and also communicate an interrupt request to each other via a header of the TLP, the system comprising:
   a PCI-Express link;
   a first RAID controller, having a first PCI-Express controller coupled to said PCI-Express link, and a first processor configured to cause said first PCI-Express controller to transmit on said PCI-Express link a PCI-Express memory write request TLP, wherein said processor is configured to cause said first PCI-Express controller to selectively set a predetermined unused bit of the TLP header to a predetermined value for use as an interrupt request flag rather than as the bit's standard function specified in the PCI-Express specification; and a second RAID controller, having a second processor, and a second PCI-Express controller coupled to said PCI-Express link, configured to receive the TLP from said first RAID controller, to write payload data of the TLP into a memory of said second RAID controller at a location specified by an address in the TLP header, and to interrupt said second processor if said interrupt request flag is said predetermined value.

79. The system of claim 78, wherein said second RAID controller further comprises:

a plurality of message buffers, coupled to said second processor, for storing a plurality of messages received on said PCI-Express link from said first RAID controller; and a register, coupled to said second processor, for storing an indication of which of said plurality of message buffers contains a valid message.

80. The system of claim 79, wherein said second PCI-Express controller is configured to interpret a predetermined unused plurality of bits of the TLP header as a message tag rather than as said bits' standard function specified in the PCI-Express specification, wherein a value of the message tag indicates one of said plurality of message buffers.

81. The system of claim 80, wherein in response to receiving said TLP, if said interrupt request flag is said predetermined value, said second PCI-Express controller is configured to update said register to indicate said one of said plurality of message buffers specified by said message tag value, prior to interrupting said processor.

82. The system of claim 81, wherein said TLP contains a message, wherein said second PCI-Express controller is configured to write said message into said one of said plurality of message buffers indicated by said message tag value, prior to interrupting said processor.

* * * * *